E. W. DEMING & A. F. GAIENNIE.
APPARATUS FOR TREATING SUGAR JUICES.
APPLICATION FILED MAY 6, 1908.
967,340.
Patented Aug. 16, 1910.
2 SHEETS—SHEET 2.
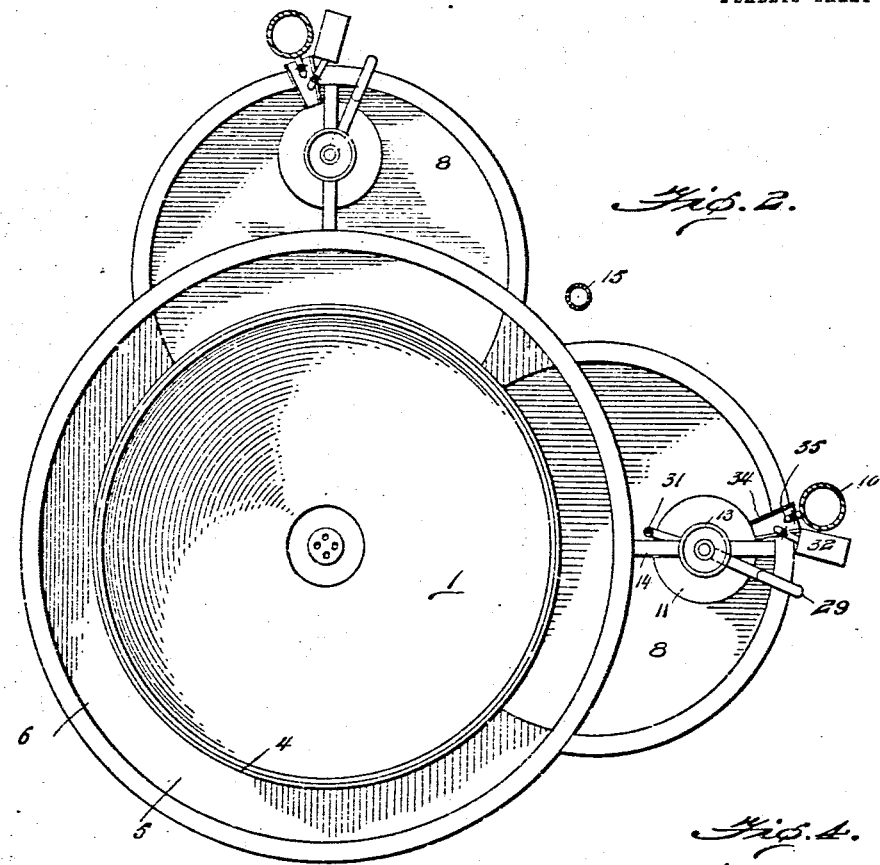
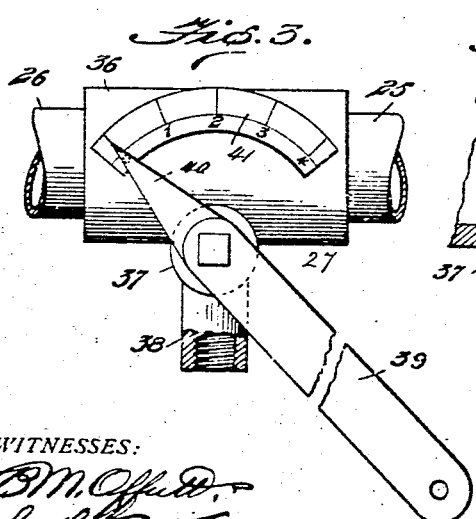
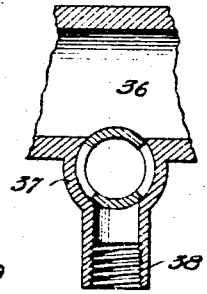
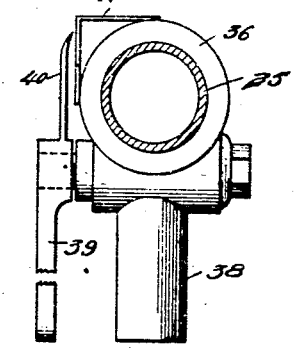
WITNESSES:
INVENTORS
Eugene W. Deming
BY Alphonse F. Gaiennie
Byrnes, Townsend & Buckenham
ATTORNEYS

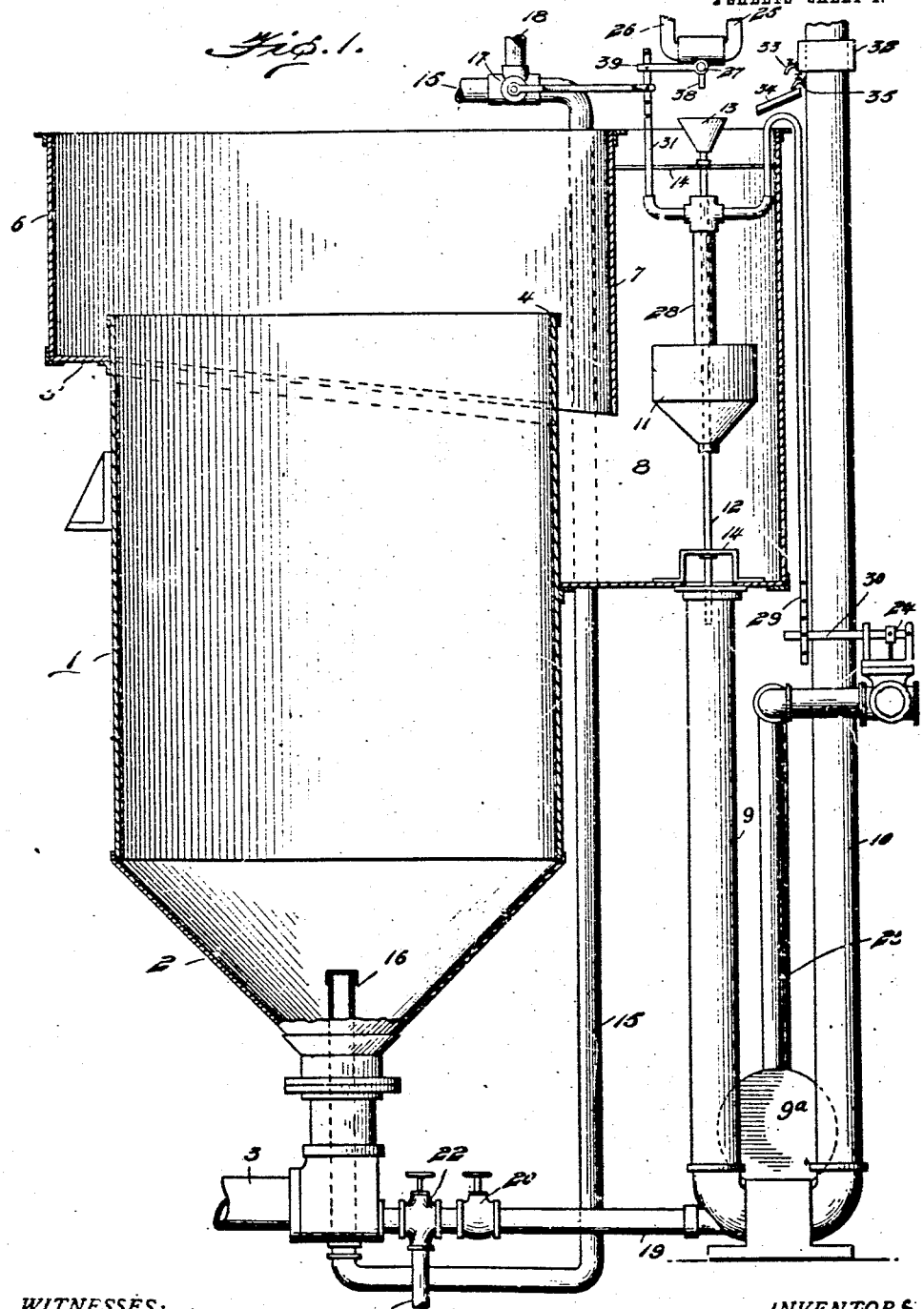

UNITED STATES PATENT OFFICE.

EUGENE W. DEMING, OF NEW YORK, N. Y., AND ALPHONSE F. GAIENNIE, OF NEW ORLEANS, LOUISIANA, ASSIGNORS TO DEMING APPARATUS COMPANY, A CORPORATION OF NEW YORK.

APPARATUS FOR TREATING SUGAR-JUICES.

967,340.   Specification of Letters Patent.   Patented Aug. 16, 1910.

Application filed May 6, 1908. Serial No. 431,203.

*To all whom it may concern:*

Be it known that we, (1) EUGENE W. DEMING and (2) ALPHONSE F. GAIENNIE, citizens of the United States, residing at (1) New York and (2) New Orleans, in the county of (1) New York and (2) parish of Orleans, and States of (1) New York and (2) Louisiana, have invented certain new and useful Improvements in Apparatus for Treating Sugar-Juices, of which the following is a specification.

This invention relates to apparatus intended particularly for the treatment of raw juices of sugar cane or the like, one object of the invention being the provision of a form of apparatus wherein the juice under continuous flow may receive such automatically regulated additions of sulfur dioxid and lime or appropriate reagents as may be required for its proper treatment.

A further object of the invention is the construction of the apparatus in such form that no deposit of mud, lime, precipitate or other insoluble matter may accumulate therein, each unit volume of juice conveying to the appropriate defecating or separating devices its associated insoluble impurities.

It is now customary to conduct the juice from the milling plant to so-called liming tanks, usually three in number, each having a capacity corresponding to the production of the mill in about one-half hour; thus a factory consuming one thousand tons of cane per day will usually have in transit some six thousand gallons of raw juice undergoing a constant and rapid deterioration. According to the usual practice sulfur dioxid is introduced into this raw juice either on its way to the liming-tanks or in these tanks, and lime is thereafter applied in the tanks and mixed with the juice before pumping the latter to the heating apparatus. According to the present invention the quantity of raw juice in transit is reduced to an amount barely sufficient for affording a safe margin for the juice pump under the conditions of variable supply from the mill, sulfur dioxid and lime being applied in regulated amounts to the flowing body of juice.

For a full understanding of our invention reference is made to the accompanying drawing showing one embodiment thereof, wherein:

Figure 1 is a central vertical section of a preferred form of apparatus; Fig. 2 is a plan view of the same, the regulating mechanism for sulfur dioxid and lime being omitted; and Figs. 3, 4, 5, are details illustrating a particular construction of the lime valve.

Referring to the drawings, 1 represents a receiving tank for raw juice having a converging bottom 2: the juice, previously screened for separation of fiber, enters the bottom of the tank through pipe 3 and overflows at 4 into an annular gutter 5, the walls 6 of which extend upwardly for a sufficient distance to retain the foam. Thence the juice passes under the depending partitions 7 into one or more indicator tanks or compartments 8, shown as two in number. Each indicator tank has a bottom discharge pipe 9 for juice leading directly to a juice pump 9ª.

10 represents the discharge line from the same pump, leading to a heating and separating apparatus, which may be of the type illustrated in U. S. Patent No. 885,450, issued April 21, 1908, to E. W. Deming. In each indicating tank is a float 11 vertically movable on a fixed tubular guide 12, surmounted by a funnel 13, this tubular guide serving also for the introduction of milk of lime into the juice, and opening into the juice discharge pipe 9; as shown the guide 12 is carried by brackets 14.

15 represents the inlet pipe for sulfur dioxid: this pipe is usually of brass and leads from a furnace or other suitable source of the gas under sufficient pressure to overcome the head of juice in the tank 1. The gas is admitted to the receiving tank 1 at its bottom, and is preferably distributed through the body of juice, as by a perforated brass nozzle or distributer 16 having upwardly inclined discharge orifices. The admission of sulfur dioxid to the juice is controlled by a three-way cock 17, having connected therewith a branch pipe 18 adapted to vent any unrequired excess of gas from the furnaces.

19 is a branch-pipe extending between the inlet pipe 3 and the outlet 9, adapted to empty the tank 1 when required, and controlled by a valve 20.

21 is a wash-out pipe leading from the branch 19 at a point between the valve 20 and the tank 1, and controlled by a valve 22.

23 represents the steam-pipe for operating the juice pump, and 24 is a balanced steam-valve adapted to be controlled by the movements of the float 11.

25, 26, represent portions of a circulating system through which milk of lime is continuously circulated at such rate as to avoid all tendency to clogging by the separation of the suspended lime; 27 is a lime valve in said circulating system, a preferred construction of this valve being shown in detail in Figs. 3, 4, 5.

In order to provide for continuous operation and for the automatic control of the amount of sulfur dioxid and lime admitted to the flowing body of juice, the float 11 is provided with an upwardly extending sleeve 28, encircling the tubular guide 12, this sleeve carrying a rod 29 adjustably engaging the lever arm 30 of the steam valve 24 in such manner that the movement of the float controls the speed of the juice pump, whereby a practically constant level is maintained in the indicator tank 8 under all conditions of juice-supply. Another arm 31 carried by the sleeve 28 controls through appropriate levers or other mechanism the cock 17 governing the sulfur dioxid inlet, and the lime valve 27. As will be readily understood the effect of this construction is to proportion the supply of sulfur dioxid and of lime to each other and to the volume of juice passing through the indicating tank in unit time.

In order that the supply of reagents, as sulfur dioxid and lime, may be properly proportioned, we prefer to provide means for indicating the condition of the juice flowing from the apparatus with respect to its acidity or alkalinity. This is very simply effected by providing a small reservoir, indicated at 32 for an appropriate indicator as phenolphthalein from which it drops at intervals through a small cock 33 upon a white porcelain plate or gutter 34. The treated juice is also permitted to drop or flow through a cock 35 upon the plate 34, the color reaction indicating to the operator the presence or absence of an excess of lime and guiding him in the initial and subsequent adjustment of the controlling levers of the valves 17 and 27 with respect to the float-arm 31. It will be understood that this adjustment requires alteration at longer or shorter intervals owing to the variations in the normal acidity of the juices or other causes.

Referring particularly to Figs. 3, 4, 5, illustrating in detail a suitable construction of lime valve, 36 represents a sleeve or casing adapted for inclusion in the circulating system 25, 26, for milk of lime, this casing carrying at its bottom a rotary cock 37 leading to a discharge nipple 38. As shown this cock is hollow with appropriate inlet and outlet apertures, and is shown in Fig. 5 in its closed position. In order to indicate the position of the cock, the controlling lever 39 may be provided with an indicating extension 40 arranged in connection with a suitably graduated scale 41 mounted on the casing 36.

In operation the juice from the milling plant is admitted to the bottom of the receiving tank and flows upwardly therethrough, the upward movement of the juice in connection with the violent agitation due to the injection of sulfur dioxid and the associated air serving to keep all solid matters in suspension and to avoid all accumulation in the receiving tank. Thence the juice overflows into the indicator tank or tanks 8, receiving milk of lime through the tube 12, which may enter the discharge line 9. Since the valves controlling the admission of sulfur dioxid and of lime are coupled directly to the steam valve controlling the juice pump, it follows that the supply of both reagents is always directly related to the volume of juice flowing; and as this coupling between the valves is adjustable, a correct proportioning of the reagents is very readily secured and maintained, the visual indication afforded by the color reaction on the white plate 34 guiding the operator.

We claim:

1. In apparatus for treating cane juices or the like, a continuous-flow receiving tank having a bottom inlet for juice, a second tank in proximity to said receiving tank and communicating therewith, a juice conduit leading from said second tank, a pump included in said conduit, a float suitably mounted in said second tank, and connections whereby the speed of the pump is controlled by said float to maintain a practically constant juice level in said second tank.

2. In apparatus for treating cane juices or the like, a continuous-flow receiving tank having a bottom inlet for juice, means for injecting sulfur dioxid in proximity to said juice inlet, a second tank in proximity to said receiving tank and communicating therewith, a juice conduit leading from said second tank, a pump included in said conduit, a float suitably mounted in said second tank, and connections whereby the speed of the pump is controlled by said float to maintain a practically constant juice level in said second tank.

3. In apparatus for treating cane juices or the like, a continuous-flow receiving tank having a bottom inlet for juice, a trough surrounding the upper portion of said tank and adapted to receive the overflow therefrom, a second tank in proximity to said receiving tank and communicating with said trough, a juice conduit leading from said second tank, a pump included in said conduit, a float suitably mounted in said second tank, and connections whereby the speed of the pump is controlled by said float to maintain a practically constant juice level in said second tank.

4. In apparatus for treating cane juice or the like, a continuous-flow receiving system for the juice, means for admitting acid and alkaline reagents thereto, and means controlled by the volume of juice traversing the system for simultaneously regulating the amount of acid and alkaline reagents admitted.

5. In apparatus for treating cane juice or the like, a continuous flow receiving system for the juice, means for admitting sulfur dioxid to the juice and for venting the same into the air, and means controlled by the volume of juice traversing the system for admitting or venting the sulfur dioxid as required.

In testimony whereof, we affix our signatures in presence of two witnesses.

EUGENE W. DEMING.
ALPHONSE F. GAIENNIE.

Witnesses:
 EDW. N. KUM,
 V. FOULON.